March 26, 1940.    D. GREGG    2,194,749
PRESSURE REGULATOR
Filed Feb. 18, 1937
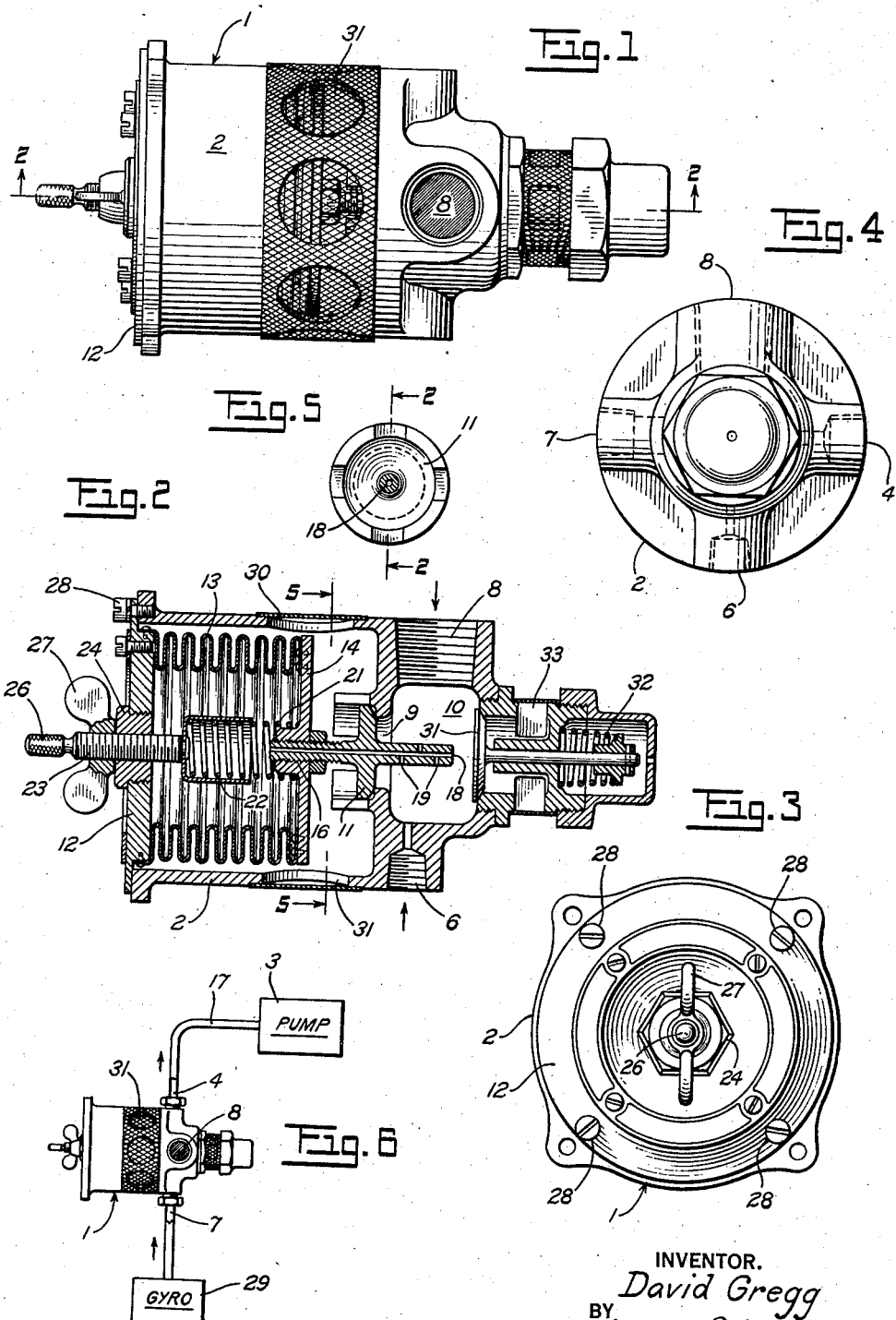
INVENTOR.
David Gregg
BY Warren T. Hunt
ATTORNEY.

Patented Mar. 26, 1940

2,194,749

UNITED STATES PATENT OFFICE 2,194,749

PRESSURE REGULATOR

David Gregg, Caldwell, N. J., assignor to Eclipse Aviation Corporation, East Orange, N. J., a corporation of New Jersey Application February 18, 1937, Serial No. 126,515

3 Claims. (Cl. 137—153)

This invention relates to pressure regulators and more particularly to regulators for automatically maintaining a constant pressure.

An object of the invention is to provide a pressure regulator in which rapid fluctuations of pressure in the operating line are damped and do not cause correspondingly rapid movements of the regulator valve.

Another object of the invention is to provide a pressure regulator in which the entire valve assembly may be inserted and removed as a unit from the regulator housing.

Another object of the invention is to provide a pressure regulator of the collapsible bellows type in which the bellows expanding spring may be readily removed and another spring inserted when such substitution is desirable.

Another object of the invention is to provide a pressure regulator which may be adjusted from the exterior of the housing.

Other objects of the invention will be apparent from the following description taken in connection with the accompanying drawing in which:

Fig. 1 is an elevational view of the improved regulator;

Fig. 2 is a sectional view taken on line 2—2 of Fig. 1;

Fig. 3 is a front end view;

Fig. 4 is a rear end view;

Fig. 5 is a sectional view taken on line 5—5 of Fig. 2; and

Fig. 6 is a diagrammatic showing of the regulator connected with the air pump and with the device from which air is drawn by the pump.

Referring to the drawing, the regulator is generally designated at 1 and is provided with a housing 2 which is connected to the pump 3 by orifice 4 and adapted to be connected to a plurality of instruments by orifices 6, 7 and 8. All of the orifices are in communication with a common chamber 10 which may communicate with the atmosphere through opening 9 normally closed by valve 11. The housing 2 is provided with an end plate 12 to which is secured a bellows 13 having a movable end plate 14 into which the stem 16 of the valve is threaded. Plate 14 must necessarily be of greater area than valve 11 in order to have the valve open at some predetermined vacuum, and must be of less area than the valve if it is to be opened by pressures greater than atmospheric pressure. The bellows 13 is connected to the suction line 17 of the pump 3 through a passage 18 having restricted openings 19 and is normally urged in a position to close valve 9 by a spring 21 which is urged against the plate 14 by a cup 22 having a threaded stem 23 extending through the nut 24, the cup being adapted to be moved in or out by the knurled portion 26 and locked in position by nut 27. Nut 24 is larger in diameter than cup 22 in order to permit the removal of cup 22 and spring 21 through the threaded opening in the cover plate 12 which is secured to the housing by screws 28. In the event of a leak developing in bellows 13 the valve 11 may fail to open, and to guard against this possibility the chamber 10 is provided with an inwardly opening valve 31. In the normal operation of the regulator valve 31 is held upon its seat by spring 32, the tension of which is so adjusted as to permit opening of the valve 31 at a pump pressure somewhat lower than the pressure at which valve 11 opens. The valve 31 is intended to operate only in an emergency whereupon it permits the entry of atmospheric air into chamber 10 by means of screened passages 33.

In the normal operation of the device, the regulator is secured between the pump and the device to be operated, for example gyroscope 29, and the adjusting screw 26 is so set as to hold valve 9 on its seat until the vacuum in chamber 10 exceeds some predetermined amount. Small fluctuation in the vacuum will not affect the pressure within bellows 13 because of the restricted openings 19, but if the lower vacuum should persist for some time, bellows 13 will collapse and permit atmospheric air to enter the pump by means of screened openings 30 and valve 9. The increased pressure will be communicated to the bellows 13 through the restricted openings 19, and in a short period of time the valve 9 will be again forced to its seat, but it will be noted that no fluttering of the valve will take place because of the dampening action of the restricted openings 19. The improved regulator may be readily dissassembled by removal of screws 28, whereupon the entire assembly, comprising cover plate 12, bellows 13 and valve 9, may be removed as a unit. If it be desired to merely substitute a new spring 21 of a different calibration from that originally used, nut 24 may be removed, whereupon cup 22 and the spring 21 may be removed through the opening and a new spring inserted.

While a preferred embodiment of the invention has been illustrated and described, it is understood this showing and description are illustrative only, and that the invention is not regarded as limited to the form shown and described or otherwise, except by the terms of the following claims:

What is claimed is:

1. In a pressure regulator, a housing having two compartments, one of which is open to atmosphere and the other of which is adapted to be connected to a source of pressure less than atmospheric pressure to produce air flow through the compartment at sub-atmospheric pressure, means forming an opening between the compartments, a collapsible bellows in the compartment open to atmosphere having one end secured to the housing and the other end movable, a valve controlling the opening between the compartments secured to the movable end of the bellows and having a stem projecting into the compartment, said stem having a central conduit connecting the interior of the bellows with the compartment adapted to be connected to a source of pressure less than atmospheric pressure, said stem having a plurality of restricted radial openings therein, said openings being angularly spaced about the stem and connecting the exterior of the stem with the conduit whereby the pressure within the bellows is substantially equal to the static pressure of the second compartment.

2. In a pressure regulator, a housing divided into two compartments one of which is subjected to sub-atmospheric pressure and the other of which is subjected to atmospheric pressure, said atmospheric compartment having an external opening and an opening into the compartment subjected to sub-atmospheric pressure, a cover plate for said external opening provided with a collapsible bellows having one end secured to the inner side of the cover plate, a poppet valve secured to the other end of said bellows and arranged to close the opening into the sub-atmospheric compartment when the bellows is expanded, said valve having a stem projecting into the sub-atmospheric compartment, said valve and stem having a conduit therethrough provided with a restricted opening for connecting the interior of the bellows with the sub-atmospheric compartment, a compression spring having one end abutting the movable end of the bellows, said cover plate having an opening of greater diameter than the diameter of said spring, a removable plug for said opening, a movable abutment for said spring of less diameter than the cover plate opening, said abutment having a stem threaded through said plug whereby the abutment may be adjusted from the exterior of the housing, and means for removably securing the cover plate to the housing, said cover plate, bellows, valve, spring, plug, abutment and threaded stem being removable from the housing as a unitary assembly.

3. In a pressure regulator for a pump, a housing divided into two compartments one of which is subjected to atmospheric pressure and the other of which is subjected to pump pressure, an opening between the two compartments, a poppet valve closing the opening having its opposite sides exposed to the pressures of the respective compartments, a collapsible bellows having a movable end wall of a different area than the area of the valve, means for exposing one side of the bellows to atmospheric pressure, means including a restricted passage for exposing the other side of the bellows to pump pressure, means for operatively connecting the bellows to the valve to open the same at a predetermined pressure, and a spring loaded valve for connecting the pump pressure compartment to the atmosphere, said valve being arranged to open at a pressure different from the pressure at which the first valve opens.

DAVID GREGG.